United States Patent [19]

Kirwan et al.

[11] 4,324,973
[45] Apr. 13, 1982

[54] ENERGY BEAM DRILLING APPARATUS HAVING OPTICAL FIBER LINK POSITION SENSOR

[75] Inventors: David F. Kirwan, West Simsbury; John R. Naumec, Willimantic, both of Conn.

[73] Assignee: United Technologies Corp., Hartford, Conn.

[21] Appl. No.: 208,901

[22] Filed: Nov. 21, 1980

[51] Int. Cl.³ .............. B23K 15/00; B23K 26/04; G01D 5/34; G08B 5/00
[52] U.S. Cl. .............. 219/121 EA; 219/121 EC; 219/121 EH; 219/121 EY; 219/121 LB; 219/121 LC; 219/121 LK; 219/121 LY; 250/231 SE; 340/380
[58] Field of Search .............. 219/121 EA, 121 EB, 219/121 EC, 121 ED, 121 EH, 121 EM, 121 EX, 121 EY, 121 LA, 121 LB, 121 LC, 121 LD, 121 LK, 121 LL, 121 LM, 121 LY; 250/231 SE; 340/380

[56] References Cited

U.S. PATENT DOCUMENTS

| | | | |
|---|---|---|---|
| 3,398,237 | 8/1968 | Paidosh | 219/121 EA X |
| 3,440,392 | 4/1969 | Erlanderson et al. | 219/121 EC |
| 3,538,312 | 11/1970 | Genähr | 340/380 |
| 3,842,236 | 10/1974 | Von Walter | 219/121 EY |
| 4,116,000 | 9/1978 | Martin et al. | 340/380 X |
| 4,117,460 | 9/1978 | Walworth et al. | 340/380 X |
| 4,240,066 | 12/1980 | Lenox | 250/231 SE |
| 4,278,866 | 7/1981 | Nevins et al. | 219/121 EC |

FOREIGN PATENT DOCUMENTS

1436054 5/1976 United Kingdom ......... 219/121 LL

OTHER PUBLICATIONS

*Industrial Research & Development*, Jun. 1980, pp. 115-120, "Newscanning Electron Microscope Depends on Multi-Function Detectors", J. J. Jackman.

*Primary Examiner*—J. V. Truhe
*Assistant Examiner*—Keith E. George
*Attorney, Agent, or Firm*—Charles G. Nessler

[57] ABSTRACT

Disclosed is an electron beam drilling system wherein an optical fiber link is used to prevent deviant drilling. The position of fixtures within a vacuum chamber is monitored by alignable fiber segments. The junctions of the segments form couples which transmit light from a source to detectors when the fixtures are properly positioned. The alignable fiber segments are mounted on and under the fixtures in a manner which integrally provides protection of the junctions from metal spatter. The light source and detectors are mounted external to the chamber; seals are provided where the fiber segments pass through the chamber wall. The detectors signal a control system to only allow beam output when the fixtures and parts thereon are properly positioned.

3 Claims, 3 Drawing Figures

ENERGY BEAM DRILLING APPARATUS HAVING OPTICAL FIBER LINK POSITION SENSOR

DESCRIPTION

Background Art

1. The present invention relates to apparatus for drilling and welding using electron beams and other energy beams.

2. Drilling and welding of metal workpieces using an electron beam often presents technical problems when machine production needs to be increased. Problems arise in fixturing and control systems because the drilling necessarily takes place in relatively high vacuum. High voltages and electromagnetic fields are present, and there is a prevalence of metal dust and vapor which are deposited everywhere in the chamber. Thus if conventional electromechanical or pneumatic fixturing and control systems are used they can upset the vacuum or welding process and be easily prone to failure in the harsh environment.

In the copending application Ser. No. 208,914 of J. Naumec entitled "Indexing Apparatus For Electron Beam Welding", filed on even date hereof, mechanical apparatus useful in drilling of holes in complex workpieces are described. As reference to this copending application will show, a multiplicity of parts is insertable into the vacuum chamber, to provide for drilling of a number of rows of holes of different position and orientation. In the Naumec apparatus, indexing of the parts with respect to a central housing is accomplished by rotation of fixtures which hold the separate airfoils. The actuation system is located outside the chamber. But fixtures may be improperly setup by the operator prior to drilling, or the apparatus may fail to operate as designed. If such failures occur, workpieces will be deviantly drilled with resultant loss of value, or the fixturing apparatus may be struck by the beam and damaged. Therefore, there is a need for a reliable system for interlocking operations of an electron beam driller or welder and to prevent beam operation when fixtures inside the chamber are mispositioned.

DISCLOSURE OF INVENTION

An object of the invention is to provide an electron beam welding or drilling system which is simply and reliably prevented from deviant operation. In particular it is an object to prevent deviant operation when drilling a multiplicity of holes in a multiplicity of fixture-mounted parts.

According to the invention a fiber optic link is combined with an energy beam system operating in a controlled environment, to drill or weld a workpiece mounted on movable fixtures. A link is comprised of a source, optical fiber segments with junctions adapted to form light transmittive couples, and a detector. For the preferred application to the above-referenced Naumec multiple drilling fixture apparatus, optical fiber junctions are located in proximity to the fixtures, and in response to the movement thereof, either do or do not transmit light from a source to a detector. Depending on the light received by a detector, the electron beam output is controlled. Thus, if the fixtures are not in proper place, drilling is prevented.

Means are provided for protecting the fiber segment ends, which form the junctions, from metal deposits. In the preferred mode, one part of the fiber junction is embedded in the fixture, and the other portion is embedded in a static part closely shielded by the fixture. The source and detector are desirably both located external to the environmental chamber. In such instances further alignable optical fiber junctions are provided in the link. These further junctions are transmittive couples made when a part of the apparatus which moves with the housing and carries a segment of the link is aligned with a part of the apparatus which has less degree of freedom.

The invention provides protection to the fixtures and avoids waste of parts by limiting beam operation when the fixtures and parts are in position to be damaged. The invention is reliable since the vulnerable parts are easily located external to the chamber and since the portions necessarily in the chamber are by construction and configuration made largely invulnerable to damage. Further, the fibers are easily sealed where they enter and leave the chamber, thereby simplifying the task of maintaining the atmosphere therein.

The foregoing and other objects, features and advantages of the present invention will become more apparent from the following description of preferred embodiments and accompanying drawings.

BEST MODE FOR CARRYING OUT THE INVENTION

The preferred embodiment of the invention is described in the context of the electron beam drilling apparatus disclosed by Naumec in his above-mentioned application.

Figure 1:
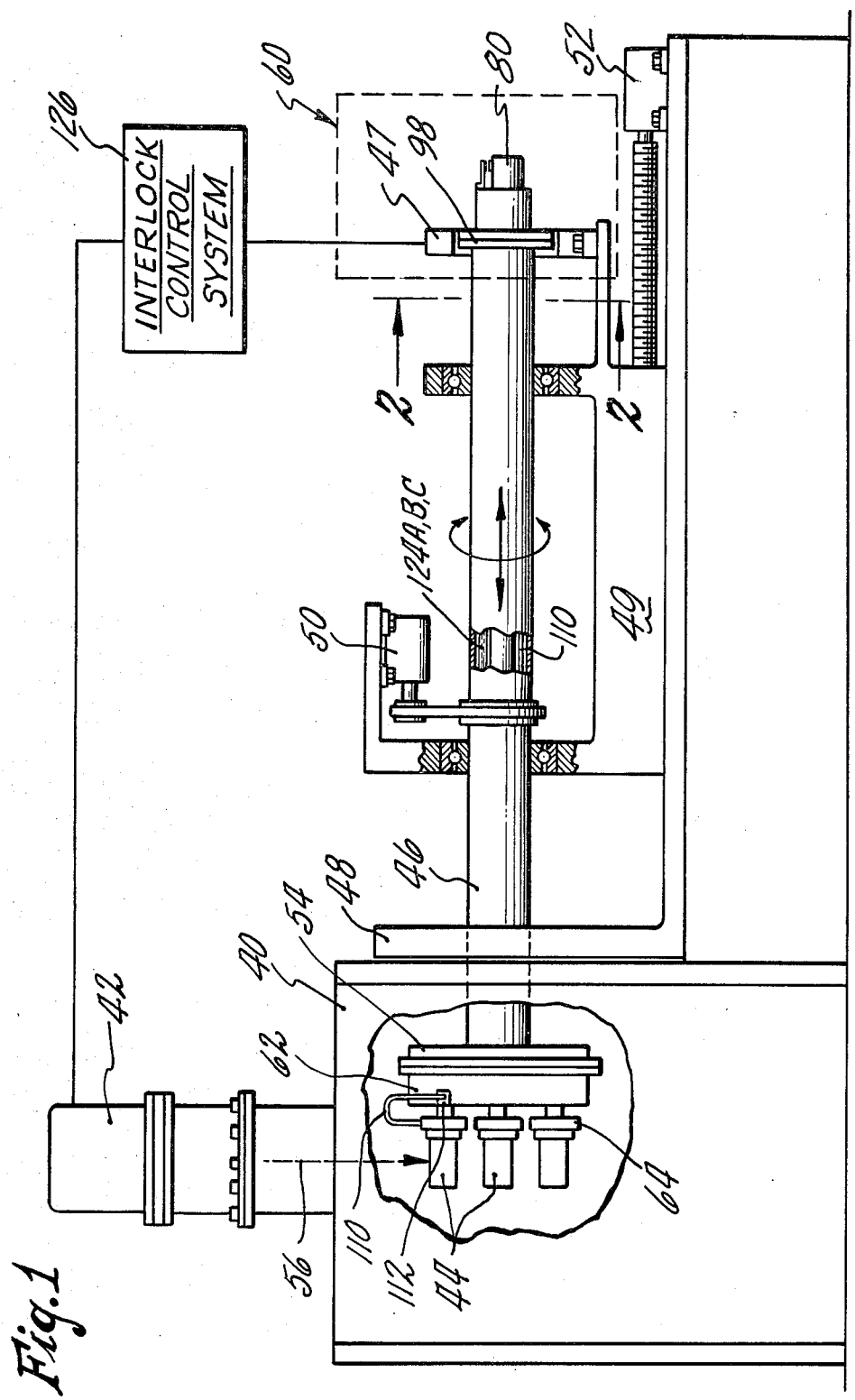
FIG. 1 is an overall view of an electron beam drilling system.
Figure 2:
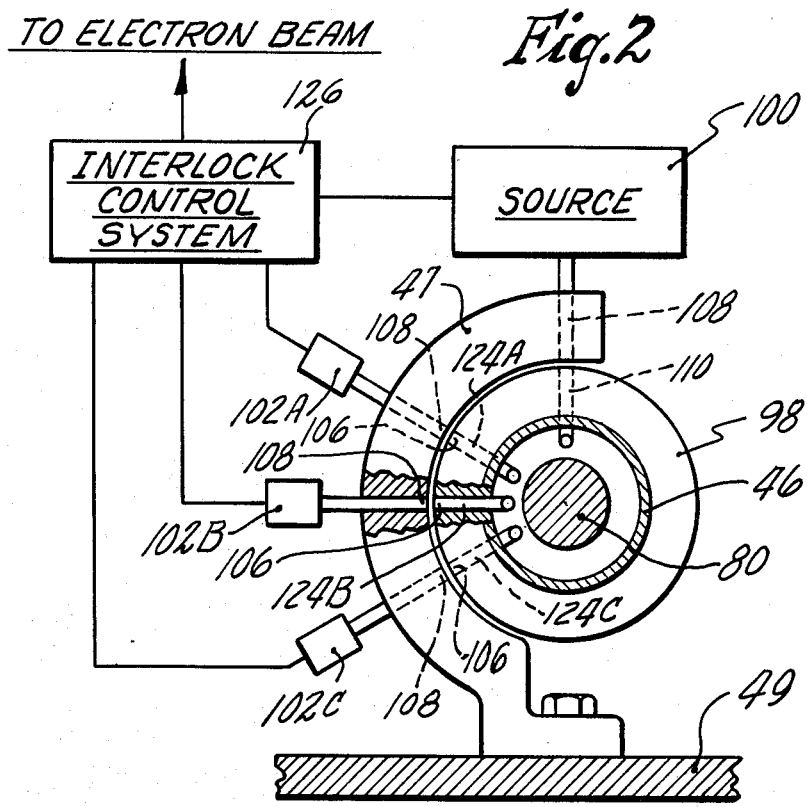
FIG. 2 shows an end view of a portion of the apparatus in FIG. 1, showing optical fiber junctions and lines.

As shown in FIGS. 1 and 2 a vacuum chamber 40 has an electron beam gun 42 connected thereto to provide an electron beam 56 directed toward the workpieces 44 which are mounted on fixtures, namely rotatable disks 64. The disks 64 are in turn mounted on a housing 62 which is fixably connected to plate 54 and manipulator shaft 46. The combination of housing, plate, and manipulator shaft are referred to hereinafter as the supporting structure. Drilling of the parts is accomplished by rotation and translation of the supporting structure. When a particular number of holes have been drilled, the workpieces 44 may be indexed with respect to the housing, by relative rotation of the disks 64. The mechanical systems for accomplishing the aforementioned indexing and drilling are described in detail in the above-mentioned Naumec patent application. On occasion, when setting up, the operator may fail to return all the disk fixtures to their zero positions. In other instances, it is possible that the mechanical system will fail. The invention described herein is intended to prevent drilling from taking place under such conditions.

The invention uses an optical fiber link, and a system of series loops which are made continuous upon proper positioning of the disks. A light source 100 is mounted external to the chamber, together with a plurality of light detectors 102 adapted to produce a signal, such as a voltage, suited to stimulate control of the beam output. Both the source and detectors are mounted so that they translate with the supporting structure. Since the supporting structure is capable of continuous rotation, coupling junctions 106-108, are provided at the periphery of the flange 98 which is fixed to the shaft 46, and hence the supporting structure. When the shaft is properly positioned upon cessation of rotation the segment junctions will be aligned to form transmittive couples 106-108. The junctions are comprised of two alignable ends of parts of the segmented fiber link, one end 106 mounted on the flange 98 and moving therewith and the other end 108 mounted on the bracket 47 attached to the frame 49 which translates with flange 98 but does not rotate. Thus, when the flange is properly rotated with respect to the bracket, every fiber junction will allow light to be transmitted.

Figure 3:
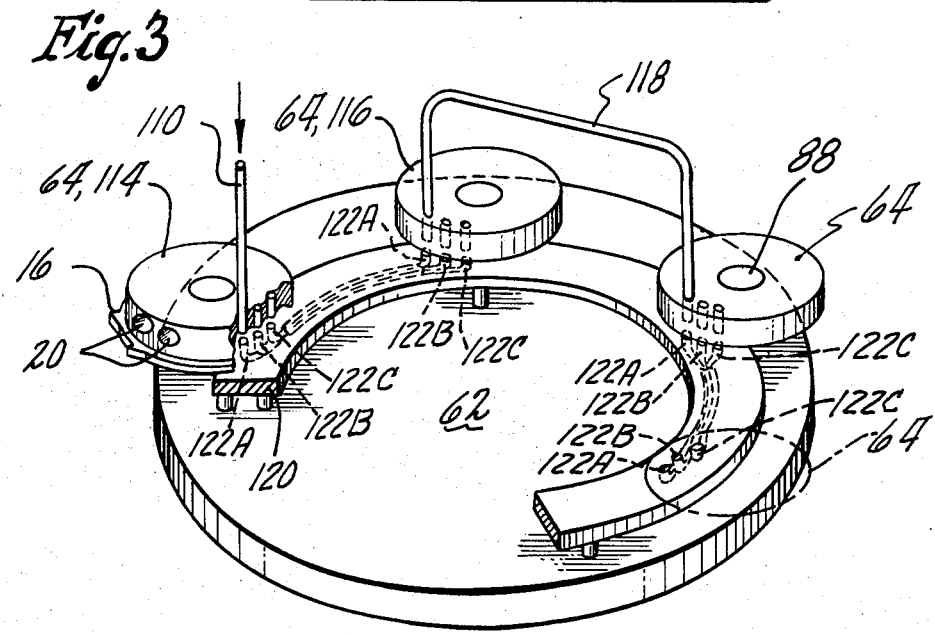
FIG. 3 shows details of the optical fiber placement and shielding on fixtures and related parts.

Referring to FIGS. 1-3, the optical fiber line 110 which carries the source light passes down the interior of the hollow manipulator shaft 46, and then passes through a vacuum seal 112. In like manner the three fiber return lines 124 are introduced into the chamber. With sufficient provision of slack fiber for the limited rotational movement of the disk, line segment 110 is embedded in a first disk 64, 114, so that its end is exposed at the undersurface of the disk. Disposed in close proximity beneath the rotational plane of the disk and mounted on the housing 62 is static plate 120. Embedded in the surface of the plate 120 are three optical fiber receptor lines 122A, 122B and 122C. Thus when the disk 114 rotates the fiber 110 may be alternately positioned over one of the three fiber receptor lines, and may form therewith a junction or couple which will permit transmission of light across the space. The positions of the receptors 122A, B, C are chosen to correlate with the angular positions of the disk 114 as determined by the cavities 20. Thus, the position of the disk may be determined according to light transmitted from the fiber 110 to any of the receptor lines; and intermediate position would produce no signal, which also can be utilized as an indicator of misposition.

The movable fixture 64 and the static plate 120 are closely spaced to provide protection to the junctions formed by the fiber segments. The ends of the fibers 122A, B, C are placed inside of and under the outer periphery of the disk. Thus, at all times the fiber ends are covered by the disk, regardless of the rotational position of the disk. In like manner, the end of the fibers 110, 118, etc. mounted in the disk are shielded by the proximity of the plate 120 to the underside of the disk. If this mutually shielded positioning is not provided, then metal vapors and spatter may land on the surface ends of the fibers, thereby blocking the transmission of light and rendering the system ineffective.

Referring again to FIG. 3 it may be seen that the lines 122A, B, C run along the plate to proximity of an adjacent disk, 64, 116 beneath which they are arrayed as described above. All the disks are similarly outfitted. The last in the series of disks has beneath it the return lines 124A, B, C which carry the light signals back to the flange 98. Thus it will be seen that when all disks are in a first position corresponding with 122A, then light will be transmitted through the entire first link from the source back to the first detector. On the other hand if one of the disks is improperly positioned, then the necessary serial junctions will not be formed and light will not be transmitted to a detector. The other positions act in like manner. As shown in FIG. 2 there are three receptor lines, each going to different detectors 102, which in response to a light signal produce an electrical signal which is transmitted to the interlock control system 126. The control system in turn is used to regulate the electron beam source 42 and the beam 56.

In use, a comman signal is given to the indexing actuators 60, whereafter a change to a position by all the disks 64 is expected. If a confirming signal is not received by activation of the appropriate optical fiber detector, the interlock control system is configured to prevent the electron beam from emanating. The interlock control system is also staged, to obtain proper sequencing from position to position, in like manner.

The preferred embodiment was shown in terms of three positions for a multiplicity of disks. But it should be apparent that the invention is useful with other serial arrangements. Generally the invention will be used when the position of any element is to be monitored and controlled, and thus the term fixture as used herein should be understood to embrace any such element.

It will also be understood that the invention also will be useful for other like energy beam processes and for controlled environments other than vacuums in which metal vapors and dusts are present.

While the preferred embodiment is as we describe above, other variations in the exact mechanical configuration are possible. For example the fibers may not be attached directly to the disk but may be mounted in a separate element, actuated by a link or cam. As another example, simply understood if only one position is monitored, (e.g. a disk moving from a first preset position to a second desired position, the second position being monitored) a segment of the fiber need not be movable, but a thin sheet of metal attached to and extending from the disk, will, by interrupting or allowing passage of light across the junction, carry out the invention.

Although this invention has been shown and described with respect to a preferred embodiment, it will be understood by those skilled in the art that various changes in form and detail thereof may be made without departing from the spirit and scope of the claimed invention.

We claim:

1. Apparatus for drilling and welding using beam energy, comprising a controlled environment chamber; a source of beam energy, the output of which is responsive to a beam signal, connected to the chamber; movable fixtures mounted on a rotatable housing within the chamber; an optical fiber link operating in combination with the fixtures comprising, a light source; a detector for generating the beam signal upon incidence of light from the source, the detector and source being mounted on parts of the apparatus located external to the chamber; a segmented optical fiber serially connecting the source and the detector, the fiber having a junction located in proximity to each of the fixtures, each junction formed by two segments of the fiber, at least one of each of said segments of the fiber being movable in response to movement of a fixture, each junction making a couple which is selectively transmittive of light through a portion of the link upon desired positioning of the fixture; and, seals along the fiber where it enters and leaves the chamber, to preserve the chamber environment; the fiber link being light transmittive when all the fixtures are moved on the housing to their respective desired positions, to thereby generate the beam signal which enables output from the beam energy source.

2. The apparatus of claim 1 further characterized by a housing which is rotationally movable relative to the beam energy source and to the parts of the apparatus upon which the detector and light source are mounted, the fiber link having additional junctions to allow free rotary movement of the housing, said further junctions being formed at the interface between a circular flange fixedly mounted with respect to the housing, and a closely fitted mating bracket mounted in close proximity to the periphery of the flange.

3. The apparatus of claim 2 wherein each fixture junction is characterized by one segment of the fiber attached to a surface of the movable fixture and the other segment attached to the surface of the housing, the surfaces of the fixture and the housing disposed in close proximity to each other, said surfaces mutually and continuously shielding the ends of the segments of the fiber which form the junction, to prevent desposition of metal dust and vapors thereon.

* * * * *